(12) United States Patent
Fox et al.

(10) Patent No.: US 7,188,461 B2
(45) Date of Patent: Mar. 13, 2007

(54) CONDITIONING ROLLER DRIVE

(75) Inventors: Thomas Russell Fox, Winnipeg (CA); John Edward Enns, East St. Paul (CA); Geoffrey U. Snider, Winnipeg (CA); James Thomas Dunn, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 11/043,433

(22) Filed: Jan. 27, 2005

(65) Prior Publication Data

US 2006/0123759 A1    Jun. 15, 2006

Related U.S. Application Data

(60) Provisional application No. 60/635,954, filed on Dec. 15, 2004.

(51) Int. Cl.
*A01D 61/00*    (2006.01)

(52) U.S. Cl. ..................... 56/16.4 C; 56/14.1
(58) Field of Classification Search ............ 56/16.4 C, 56/14.1, 16.4 R, 11.5, 11.7, 14.6, DIG. 1
See application file for complete search history.

(56) References Cited

U.S. PATENT DOCUMENTS

| | | | | |
|---|---|---|---|---|
| 4,472,927 A | * | 9/1984 | Vogt et al. ............... 56/16.4 R |
| 4,896,483 A | * | 1/1990 | O'Halloran et al. ............. 56/1 |
| 4,910,947 A | * | 3/1990 | Seymour .................. 56/16.4 R |
| 5,022,219 A | * | 6/1991 | Knurr et al. ............. 56/16.4 R |
| 5,056,302 A | | 10/1991 | Rosenbalm et al. |
| 5,357,737 A | | 10/1994 | Ermacora et al. |
| 5,435,239 A | | 7/1995 | Talbot |
| 6,058,688 A | * | 5/2000 | Krambeck et al. ........... 56/14.5 |
| 6,220,007 B1 | | 4/2001 | Doerr et al. |

FOREIGN PATENT DOCUMENTS

CA    2406419    4/2004

\* cited by examiner

*Primary Examiner*—Árpád Fábián Kovács
(74) *Attorney, Agent, or Firm*—Adrian D. Battison; Michael R. Williams; Ryan W. Dupuis (57) ABSTRACT

A forage conditioner for conditioning cut crop material from a forage harvester includes a fixed bottom fluted roller carried in end housings and a top fluted roller which is pivotally mounted on the housings by a linkage pivotal relative to the housing about an axis lying in a plane at right angles to the roller axes so that the top roller is liftable from crushing position against the bias of a spring extending along the top roller. Rotation of the bottom roller is transferred to the top roller through a gear train which includes two idler gears each mounted on a respective arm with the arms constrained to move symmetrically relative to the rollers by intermeshing teeth on the arms so as to control the angular timing of the rollers to ensure accurate intermeshing of the flutes.

19 Claims, 6 Drawing Sheets

CONDITIONING ROLLER DRIVE

This application claims priority under 35 U.S.C. 119 from U.S. Provisional Application Ser. No. 60/635,954 filed Dec. 15, 2004.

This invention relates to a conditioning roller assembly of the type for use in a hay or other forage crop conditioner.

BACKGROUND OF THE INVENTION

Hay conditioners generally include a pair of rollers mounted in co-extensive parallel relationship for rotation about respective axes with the crop arranged to pass between the rollers in a conditioning action.

Each of the rollers carries a plurality of longitudinally extending angularly spaced flutes which project outwardly from the surface of the roller. The rollers are spaced by a distance such that the flutes intermesh generally without contact between the rollers. The intermeshing of the flutes causes the crop material to be bent as it passes between the rollers causing a cracking of the waxy surface of the crop stem.

It is necessary in such rollers to allow one of the rollers, generally the top roller, to move in a direction to increase the spacing between the axes of the rollers to accommodate different amounts of crop material passing between the rollers and to accommodate obstacles such as stones and sticks which pass through without damage to the rollers. Generally this movement is provided by suspending each end of the top roller on a spring biasing system which allows each end independently to rise and lower in a floating action.

In view of the fact that the rollers carry intermeshing flutes, it is essential to ensure that the rollers are driven in synchronism at all times including accommodating the lifting movement while synchronism is maintained.

A number of previous designs have been proposed and manufactured to provide the drive from the first roller to the second roller to maintain the necessary synchronism. One arrangement includes a gear box having an input attached to the bottom roller and an output shaft attached to the top roller. The output shaft includes universal joints which allows the output shaft to accommodate the up and down movement of the top roller shaft. The gear box arrangement is expensive and is of relatively wide width.

An alternative arrangement includes a double chain drive system. In this system, a drive sprocket on the end of the bottom roller and two idler sprockets are located in a common plane at right angle to the axis of the bottom roller at the apexes of a triangle. A chain wrapped around these three sprockets engages a fourth sprocket driven by the chain between the drive sprocket and one of the idler sprockets. A second chain communicates drive from a fifth sprocket coaxial with and co-rotatable with the fourth sprocket to a driven sprocket on the end of the top roller. The top roller is then positioned within the apexes defining the triangle and can pivot relative to the axis of the fourth and fifth sprocket. This arrangement is highly complex involving a high number of idler sprockets thus increasing cost and increasing chain wear. The double chain arrangement also significantly increases the width of the device since it must accommodate the two chains side by side.

A yet further arrangement is shown in U.S. Pat. No. 5,435,239 (Talbot) issued Jul. 25, 1995 and assigned to the present assignees. This shows a particular chain driving system which communicates drive from the bottom roller to the top roller while ensuring the proper synchronism despite changes in spacing between the rollers, while acting to minimize the size and complexity of the drive system.

However there remains a requirement to yet further increase the length of the rollers to maximize crop throughput and to minimize the amount of crop per unit length to obtain the best conditioning action on the crop. At the same time, the amount of space available is limited by the geometry of the supporting machine, and in some designs the conditioner is located between two spaced support legs of the frame of the machine which are set at a distance which cannot readily be changed. The only way therefore to increase the length of the rollers is to reduce the width of the drive system which must be accommodated at the end of the rollers between the legs. Attempts, such as that in the above Talbot patent have been made therefore for many years to minimize the complexity of the drive and therefore its dimension.

At the same time, the shape and arrangement of the flutes must be selected to ensure effective conditioning.

Prior U.S. Pat. No. 6,220,007 (Doerr) assigned to Vermeer, U.S. Pat. No. 5,056,302 issued Oct. 15, 1991 (Rosenbalm) assigned to Deere and U.S. Pat. No. 5,357,737 issued October 25, 1994 (Ermacora) assigned to Kuhn all provide a design using meshing gears which connect from a gear on the driven bottom roller through idler gears to a driven gear on the top roller. In all these patents the top roller is mounted for movement in an arc about a pivot point. The gear arrangement is designed to minimize or reduce changes in angular timing between the rollers as they rotate while the distance between them is varying.

In Canadian Application 2,406,419 filed Oct. 4, 2002 and published in April 2004 by the present Assignees is disclosed an arrangement in which timing is communicated between the rollers by a resilient rubber star wheel on one of the rollers which meshes with a rigid gear wheel on the other. This arrangement has not proven to be successful.

SUMMARY OF THE INVENTION

It is one object of the present invention, therefore, to provide an improved arrangement of conditioning rollers.

According to one aspect of the invention there is provided a conditioner for conditioning cut crop material from a harvester comprising:

a first roller and a second roller, each roller having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the rollers in generally parallel relationship for rotation of each roller about its axis;

the mounting assembly mounting the rollers so as to allow relative movement of the second roller relative to the first roller in a direction to increase and decrease spacing between the axes of the rollers from a closed position in which the flutes of the second roller intermesh with the flutes of the first roller to an open position in which the flutes of the rollers are no longer intermeshing;

the mounting assembly being arranged to direct the movement of the second roller such that its axis remains within a plane;

the rollers being substantially coextensive such that a first end of the first roller lies adjacent a first end of the second roller and a second end of the first roller lies adjacent a second end of the second roller;

a drive input for driving rotation of at least one of the first and second rollers; and a drive timing device for transferring rotation between the first roller and the second roller arranged to maintain accurate angular timing between the first and second rollers as the rollers rotate and as the spacing between the axes of the rollers changes.

The arrangements disclosed herein can be used is systems where both rollers are independently driven and the drive connection therebetween provides communication of forces between the rollers for timing and systems where only one of the rollers is driven and the drive forces to the other are communicated through the drive connection.

Preferably the plane is arranged such that it contains the axes of the first and second rollers, although the plane which is generally radial to the axis of the first roller may be offset from the axis of the first roller.

Preferably each of the first and second mounting arrangements include a link pivotal about a link pivot axis which is at right angles to a plane longitudinal of the second roller axis and lying in the direction of movement of the second roller.

Preferably the link has a first end pivotal relative to a mounting fixed to the second roller about a first link pivot axis at right angles to said plane and a second end pivotal about a second link pivot axis parallel to and spaced from the first link axis.

Preferably the second end of the pivotal link is pivotally connected to a link portion pivotal relative to the link about the second link pivot axis and the link portion being movable in a direction longitudinal of the axis of the roller to accommodate pivotal movement of the link.

Preferably the second roller is mounted in a support including a top member parallel to the second roller from which the second roller is supported, and wherein the link is pivotal relative to the top member.

Preferably there is provided a spring acting to bias the second roller downwardly toward the first roller and wherein the spring is connected between the top member and the link.

Preferably the spring extends along the top member generally parallel to the axis of the second roller.

Preferably the spring acts to apply force to the second roller through the link and extends generally parallel to the axis of the second roller.

Preferably the drive transfer assembly comprises:

a first gear wheel attached to the first roller at one end thereof and coaxial therewith about the first roller axis;

a second gear wheel attached to the second roller at one end thereof and coaxial therewith, a third idler gear meshing with the first gear and a fourth idler gear meshing with the third idler gear and the second gear wheel such that rotation of the first roller is communicated through the third and fourth idler gears and the second gear wheel to the second roller;

the first gear wheel, the second gear wheel and the third and fourth idler wheels being coplanar and arranged for rotation about parallel axes a first arm mounted for pivotal movement about the axis of the first roller;

a second arm mounted for pivotal movement about the axis of the second roller;

the third idler wheel being mounted on the first arm for rotation relative thereto about a third idler wheel axis thereon, so as to define an imaginary line longitudinally of the first arm joining the third idler wheel axis and the;

the fourth idler wheel being mounted on the second arm for rotation relative thereto about a fourth idler wheel axis thereon;

the first and second arms being linked for pivotal movement of the first arm relative to the second arm about the axis of the third idler roller and for pivotal movement of the second arm relative to the first arm about the axis of the fourth idler roller;

and the first and second arms being constrained to move symmetrically relative to an imaginary center line at right angles to a line joining the axes of the first and second rollers to maintain an angle of the first arm between the imaginary center line and a line joining the first roller axis and the third idler wheel axis equal to an angle of the second arm between the imaginary center line and a line joining the second roller axis and the fourth idler wheel axis.

Preferably the first and second arms are linked by a link member connected to the first arm for pivotal movement about the third idler wheel axis and connected to the second arm for pivotal movement about the fourth idler wheel axis.

Preferably the first and second arms are constrained to move symmetrically by intermeshing gear teeth provided on the first arm and centered around the third idler wheel axis and provided on the second arm and centered around the fourth idler wheel axis.

According to a second aspect of the invention there is provided a conditioner for conditioning cut crop material from a harvester comprising:

a first roller and a second roller, each roller having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the rollers in generally parallel relationship for rotation of each roller about its axis;

the mounting assembly mounting the rollers so as to allow relative movement of the second roller relative to the first roller in a direction to increase and decrease spacing between the axes of the rollers from a closed position in which the flutes of the second roller intermesh with the flutes of the first roller to an open position in which the flutes of the rollers are no longer intermeshing;

the mounting assembly being arranged to direct the movement of the second roller such that its axis remains within a plane;

the rollers being substantially coextensive such that a first end of the first roller lies adjacent a first end of the second roller and a second end of the first roller lies adjacent a second end of the second roller;

a drive input for driving rotation of at least one of the first and second rollers; and a drive timing device for transferring driving rotation between the first roller and the second roller to maintain accurate angular timing between the first and second rollers as the rollers rotate and as the spacing between the axes of the rollers changes;

wherein the drive timing device comprises:

a first gear wheel attached to the first roller at one end thereof and coaxial therewith about the first roller axis;

a second gear wheel attached to the second roller at one end thereof and coaxial therewith, a third idler gear meshing with the first gear and a fourth idler gear meshing with the third idler gear and the second gear wheel such that rotation of the first roller is communicated through the third and fourth idler gears and the second gear wheel to the second roller;

the first gear wheel, the second gear wheel and the third and fourth idler wheels being coplanar and arranged for rotation about parallel axes a first arm mounted for pivotal movement about the axis of the first roller;

a second arm mounted for pivotal movement about the axis of the second roller;

the third idler wheel being mounted on the first arm for rotation relative thereto about a third idler wheel axis thereon, so as to define an imaginary line longitudinally of the first arm joining the third idler wheel axis and the;

the fourth idler wheel being mounted on the second arm for rotation relative thereto about a fourth idler wheel axis thereon;

the first and second arms being linked for pivotal movement of the first arm relative to the second arm about the axis of the third idler roller and for pivotal movement of the second arm relative to the first arm about the axis of the fourth idler roller;

and the first and second arms being constrained to move symmetrically relative to an imaginary center line at right angles to a line joining the axes of the first and second rollers to maintain an angle of the first arm between the imaginary center line and a line joining the first roller axis and the third idler wheel axis equal to an angle of the second arm between the imaginary center line and a line joining the second roller axis and the fourth idler wheel axis.

Thus there is an interconnection by way of the teeth on the arms which provides a symmetrical pivoting movement of the two arms which is necessary to accommodate the linear or planar movement of the upper roller. Because of the linear movement, the symmetrical arrangement of and the interconnection between the two pivoting arms provides the necessary timing action.

According to a third aspect of the invention there is provided a conditioner for conditioning cut crop material from a harvester comprising:

a first roller and a second roller, each roller having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the rollers in generally parallel relationship for rotation of each roller about its axis;

the mounting assembly mounting the rollers so as to allow relative movement of the second roller relative to the first roller in a direction to increase and decrease spacing between the axes of the rollers from a closed position in which the flutes of the second roller intermesh with the flutes of the first roller to an open position in which the flutes of the rollers are no longer intermeshing;

the rollers being substantially coextensive such that a first end of the first roller lies adjacent a first end of the second roller and a second end of the first roller lies adjacent a second end of the second roller;

a drive input for driving rotation of at least one of the first and second rollers; and a drive timing device for transferring driving rotation between the first roller and the second roller to maintain accurate angular timing between the first and second rollers as the rollers rotate and as the spacing between the axes of the rollers changes;

wherein the mounting assembly includes a first mounting arrangement at a first end of the rollers and a second mounting arrangement at a second end of the rollers with the first and second mounting arrangements arranged to allow independent relative movement of the second roller between the closed position and the open position at each end of the rollers;

wherein each of the first and second mounting arrangements includes;

a mounting assembly attached to the second roller;

a first link pivotal about a first link pivot axis which is at right angles to a plane longitudinal of the second roller axis and lying in the direction of movement of the second roller;

wherein the first link has a first end pivotal relative to the mounting assembly about said first link pivot axis and a second end pivotal about a second link pivot axis parallel to and spaced from the first link pivot axis wherein the second end of the pivotal link is pivotally connected to a second link pivotal relative to the first link about the second link pivot axis and the second link being movable in a direction longitudinal of the axis of the roller to accommodate pivotal movement of the first link wherein the first link constrains movement of the second roller to a plane which contains the axes of both the first and second rollers.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

A forage conditioner 10 comprises a first bottom roll 11 and a second top roll 12 which meet in a central area 13 through which the crop material passes in a conditioning action. The crop conditioner is mounted on a crop harvesting machine 14 the only part of which is shown is the supporting leg 15 which extends from a main frame structure downwardly and forwardly to provide support for a back sheet and a table.

The construction and arrangement of conditioners of this general type on a crop harvesting machine, particularly a swather is well known to one skilled in the art so it is not necessary to describe in detail the cooperation between the conditioning assembly and the harvester itself.

In general, the bottom roll 11 is fixed relative to a support housing 16 which is in turn mounted on the leg 15 so that the crop passes over the bottom roller 11 while that roller remains fixed in place between the leg 15 and a corresponding leg at the opposite end of the rollers 11 and 12.

The top roller 12 is spring biased downwardly onto the bottom roller so as to apply a downward force onto crop passing through the area 13. The top roller 12 can however rise from a closed position to a raised position in the event that a foreign object or a thick portion of the crop material passes through the area 13 thus forcing the rollers apart.

The housing 16 shown only schematically carries bearings 22 which support the fixed roller 11 at a fixed location on the housing and thus at a fixed location relative to the machine 14. The bearings allow rotation of the bottom roller 11 about an axis 23. A pulley 21 is directly mounted on a shaft 24 at the end of the roller 11 so that the pulley also remains on the axis 23 and fixed relative to the machine. The pulley is driven by a drive belt not shown. The shaft may also be driven by other means such as a hydraulic motor. As the bottom roller 11 is fixed, the drive to it is fixed.

The top roller 12 is mounted on a shaft 30 carried in two end bearings 31 each mounted on a respective support plate 32. Each support plate 32 extends along the respective end face of the roller 12 to a position beyond an upper edge of the end face where each support plate 32 is attached to a top beam 33 extending along the roller 12 across the top of the roller 12 and parallel to an axis 34 of the roller 12. Thus the roller 12 is supported in what is in effect a cradle defined by the top or cross beam 33 and the two depending support plates 32. The cradle itself is mounted for movement of the top roller in a direction upward and downward of the housing so as to move the roller 12 from a closed position in which the space 13 is a minimum set position to the raised position. Each end of the roller 12 can rise independently of the other end on the mounting linkage relative to the housing.

Each end of the top beam 33 is attached to the housing 16 by a linkage generally indicated at 36. The linkage 36 includes two links 38 and 39. The link 38 is pivotally mounted at one end on a pin 40 carried on the beam 33. The link 39 is pivotally connected at one end by on a pin 41 to the opposite end of the link 38 and extends generally downwardly therefrom to a pin 42 at its lower end where it is pivotally connected to the housing 16. As seen by comparing the closed position on the left hand end of the beam 33 and the open or raised position at the right hand end, upward movement of the roller and its beam causes the pin 40 to move upwardly which causes the link 38 to pivot about the pin 40 forcing the pin 41 outwardly. This outward movement is accommodated by pivoting movement of the link 39 about the bottom pin 42.

In this way the beam 33 at its respective end can move upwardly by pivotal movement of each of the link members relative to the corresponding mounting pins 40 and 41. This arrangement in which the axis of the pin 41 and the axis of the pin 40 are parallel and each lies in a plane at right angles to the axes 23 and 34 of the top and bottom rollers provides a large amount of movement of the end of the roller to accommodate larger foreign objects without causing damage to the structure.

Each of the rollers 11 and 12 includes an outer cylindrical roller surface 11A, 12A. On each of the outer cylindrical surfaces is provided a plurality of flutes 50 where the flutes 50 of the bottom roller are substantially identical to the flutes 50 of the top roller. The flutes and rolls can be formed in many ways known to one skilled in the art. For example there are intermeshing rolls in the prior art that are not necessarily a cylinder with flutes attached. The flutes also do not have to be "substantially identical" between top and bottom rolls. Some existing designs are molded out of rubber and other materials. Cross sections vary. Some intermeshing rolls have straight bars. Some intermeshing rolls have spiral patterns and some have chevron patterns molded into them. Some machines use a steel roll and a rubber roll intermeshing. As one example as shown, each flute is formed from a bent metal plate forming a generally V shaped cross section with the bottom edge of the two legs of the V shape being welded to the outer surface 11A, 12A. Thus the V shape projects outwardly to an apex spaced outwardly from the surface 11A, 12A with the apexes lying in a common imaginary cylindrical surface spaced outwardly from the respective roller surface. The flutes are spaced each from the next leaving a portion of the surface free from the flutes. The flutes are spaced such that, where the flutes intermesh, with the apex of the flute of one roller immediately adjacent the surface of the other roller, there is space on either side of that flute between that flute and the two flutes of the other roller.

The top roller 34 in the closed position is supported such that the apexes of the top roller as they intermesh with the flutes of the bottom roller are spaced from the roller surface of the bottom roller. This closed position is supported by a suitable stop or abutment (not shown). The stop is adjustable so as to adjust the spacing between the apex of each roller and the roller surface of the other roller.

In the raised position of the top roller, the pivot pin 40 moves to a position above the pivot pin 41 so that there is sufficient spacing between the rollers that the flutes move out of intermeshing relationship.

Crop material passes from a position forward of the rollers rearwardly into engagement with the top roller and then the bottom roller so that the crop material passes between the intermeshed flutes of the rollers in the closed positions of the rollers. The crop material is thus bent over each of the apexes of the immediately intermeshing rollers to effect a conditioning action where the crop material is cracked to allow the escape of moisture.

The top roller is spring biased downwardly into contact with the crop by a pair of springs 44, 46 operating at opposite ends of the top roller. Each spring is mounted within the beam 33 so that they extend generally along the beam 33 from an inner end 44A, 46A carried on a bracket 47 attached to the beam 33. The outer end of the respective spring carries a threaded rod 48 which extends from the outer end of the spring to the pin 41 to which is attached by a collar located at the outer end of the link 38A. Thus the spring pulls inwardly tending to pull the pin 41 toward the end of the beam 33 and holding the structure in the closed position. In the event that the link 38A is pivoted outwardly about the pin 40 by lifting of the end of the roller, the rod 48 is moved outwardly thus tensioning the spring 44 until the rod sits on the pin 40 with the link 38 pulled to its outer position with the end of the roller thus lifting accordingly.

A single spring acting between both links can be used but it is preferred that two separate springs be used since these are then independent and thus allow more independent lifting of the two ends without a tendency for the lifting on one end to affect the lifting of the other end.

The two links and the spring at each end of the top roller provides a spring force tending to press the top roller downwardly. However this spring force can be controlled by the geometry so that it does not increase linearly proportional to the increase in spacing but instead is relatively constant throughout the movement or even decreases beyond a certain amount of movement. This provides a force tending to keep the rollers in the closed position and to apply pressure to the crop but does not provide an excessive force which can drive the top roller downwardly at a high velocity and with a high force onto bottom stops, in the event that the lifting force on the roller is suddenly removed, which could cause damage to the drive and mounting arrangements. The particular force profile can be readily selected by the geometry and dimension of the spring and links.

The amount of movement of the top roller, which is approximately equal to double the length of the first link 38, can be relatively large in comparison which other systems providing as much as 5 to 6 inches in potential movement.

Despite the centering effects of the two springs, the top roller can tend to move or slop side to side on the links and hence it is desirable to provide a guiding arrangement which guides the movement of the top roller in the vertical direction so as stop or limit the potential side to side movement.

A stop 42A on the link 39 can be adjusted upwardly and downwardly by a screw 42B and carriage 42C for engaging a pin 42D on the top roller mounting to control the minimum spacing position of the top roller relative to the bottom roller.

The control of the rotation movement of the first and second rollers is obtained by a meshing gear arrangement generally indicated at 50. This is shown in front elevation in FIGS. 2 and 3 where it is shown mounted at the end of the rollers opposite the drive system. Thus the control system comprises a train of gears which communicates drive from the driven bottom roller to the top roller in both the closed positions and the open positions and in any positions therebetween so as to maintain the required angular rotation of the rollers so that they can properly mesh when they return to the closed position without impact between the meshing teeth.

Figure 5:
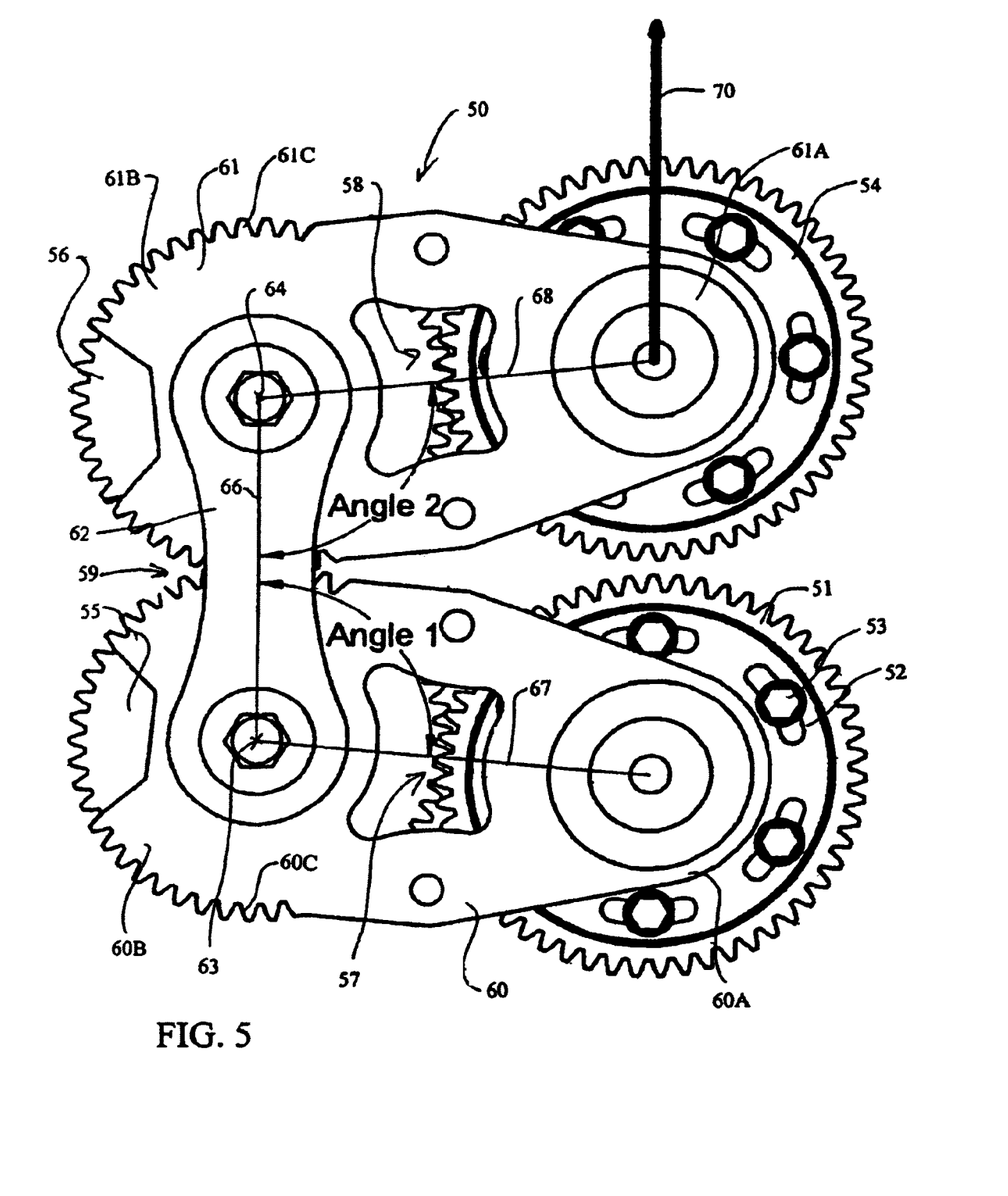
FIG. 5 is an end elevational view of the conditioner of FIG. 1 showing the drive transfer assembly in the closed position of the rollers.
Figure 6:
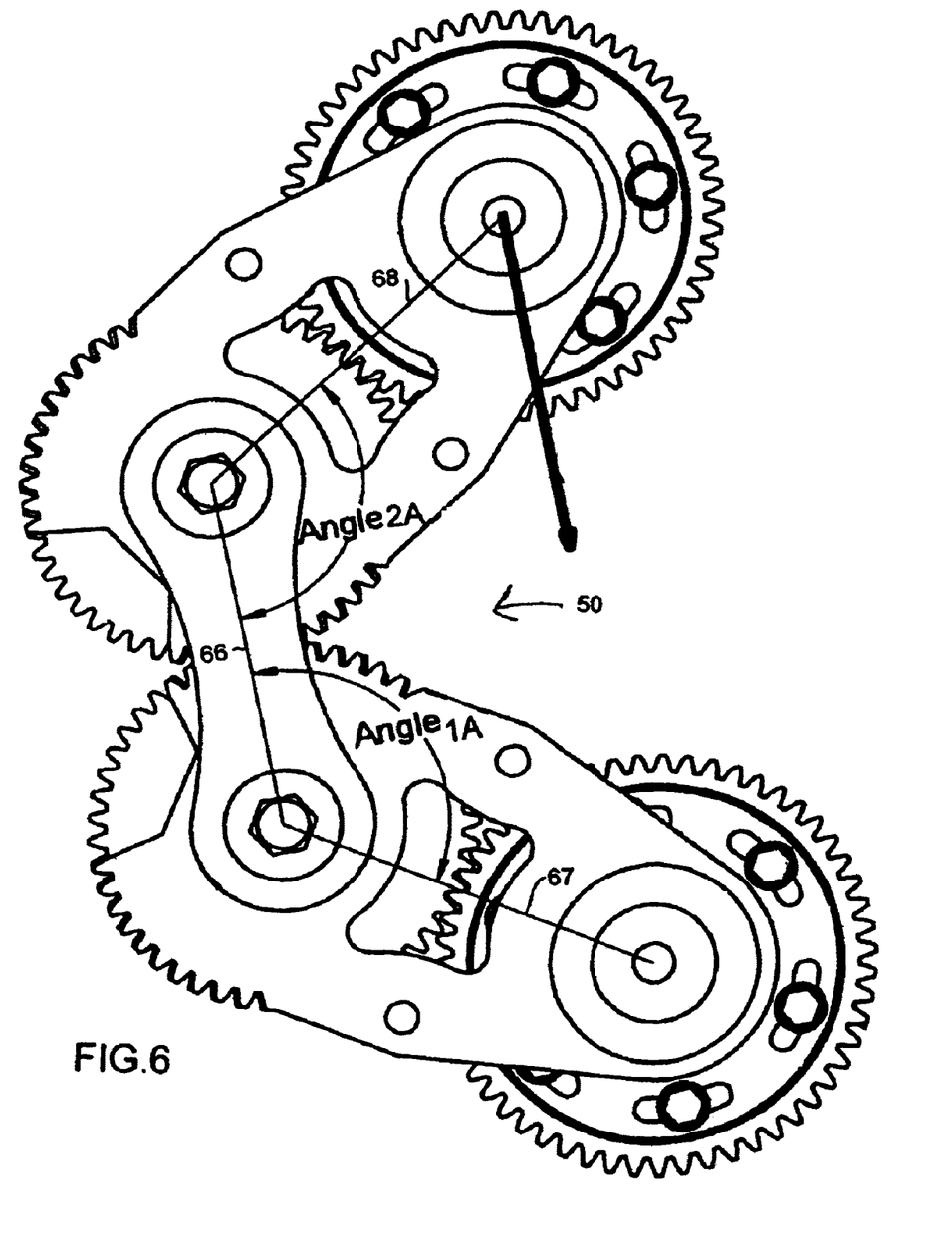
FIG. 6 is an end elevational view of the conditioner of FIG. 1 showing the drive transfer assembly in the open position of the rollers.

The coupling 50 is shown in elevation in FIGS. 5 and 6 where in FIG. 5 is shown substantially the closed position where the teeth are substantially meshing and in FIG. 6 is shown the open position in which the rollers have moved apart.

The bottom driven roller 11 carries a first gear wheel 51 of the gear train 50 which is coaxial with the bottom roller 11 for rotation with the drive shaft 24 of the roller in the bearings 22. The angular position of the first gear wheel 51 is adjustable relative to the shaft 24. The adjustment is effected by way of elongate mounting slots 52 which couple the gear wheel to an end plate by way of bolts 53.

The coupling 50 further includes a second gear wheel 54 symmetrical to the first but mounted on the second roller 12 using a symmetrical mounting arrangement. Thus the second gear wheel is coaxial with the second roller and moves with it as it moves upwardly and downwardly during the operating action.

There is at no time any meshing arrangement between the first gear wheel 51 and the second gear wheel 54 and even in the fully closed position shown in FIG. 5 where the rollers (not shown) are in complete meshing arrangement, the gear wheels 51 and 54 do not mesh.

Instead drive communication from the gear wheel 51 to the gear wheel 54 is provided through two idler gears including a third idler gear 55 and a fourth idler gear 56. The third idler gear meshes with the first gear wheel 51 at a meshing connection generally indicated at 57. The fourth idler wheel meshes with the second gear wheel at a meshing connection generally indicated at 58. The third and fourth idler gears communicate through a meshing connection generally indicated at 59. Thus drive from the bottom rollers communicated through the first gear wheel to the third idler wheel and from the fourth idler wheel to the second gear wheel using direct meshing arrangements. The arrangements are symmetrical so that the radius and number of teeth of the first and second gear wheel is identical and in addition the radius and number of teeth of the third and fourth idler wheels is also identical. However it is not necessary that the diameter and number of teeth of the third idler wheel matches that of the first gear wheel.

Figure 1:
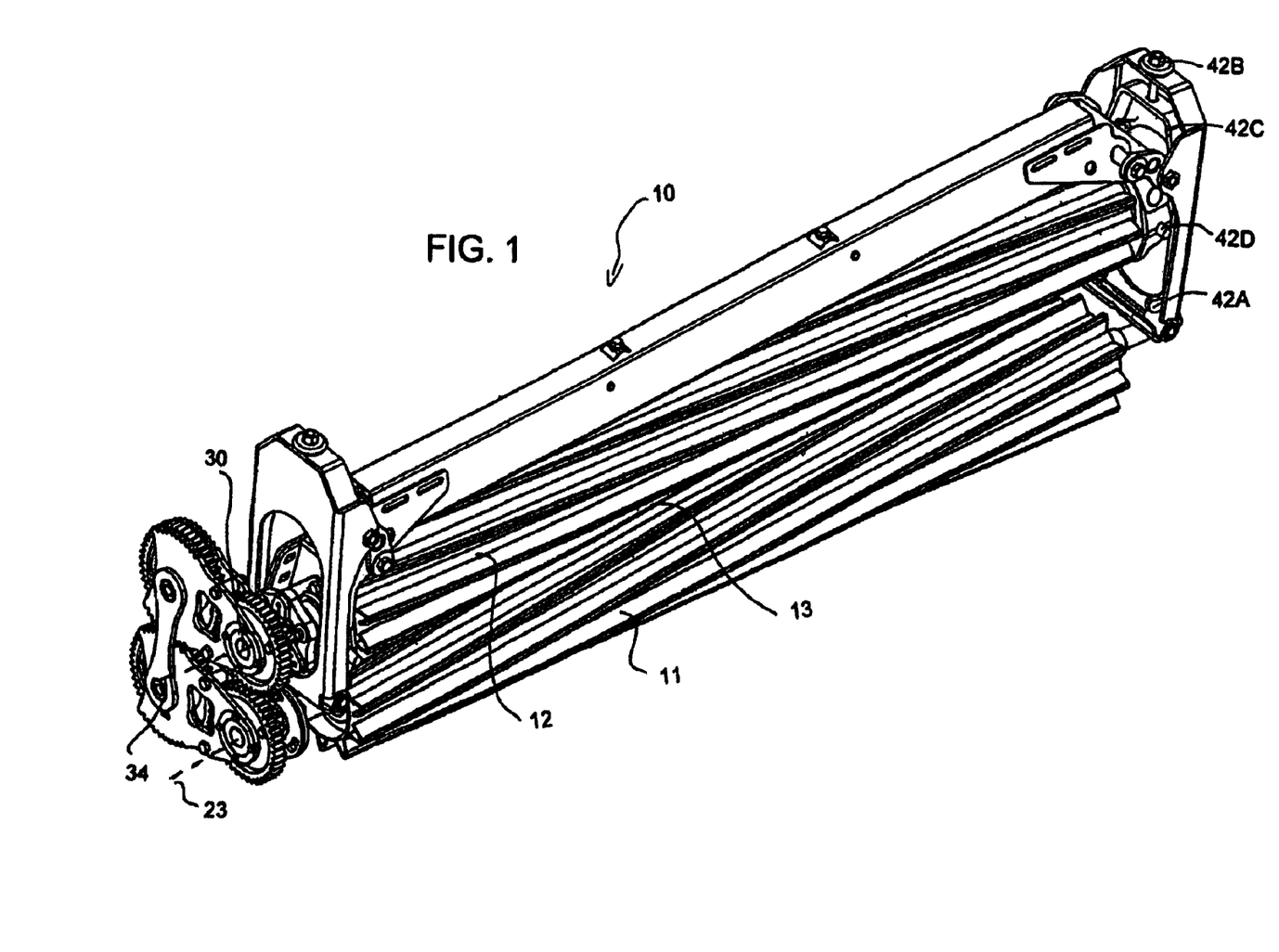
FIG. 1 is an isometric view of a forage conditioner according to the present invention.
Figure 2:
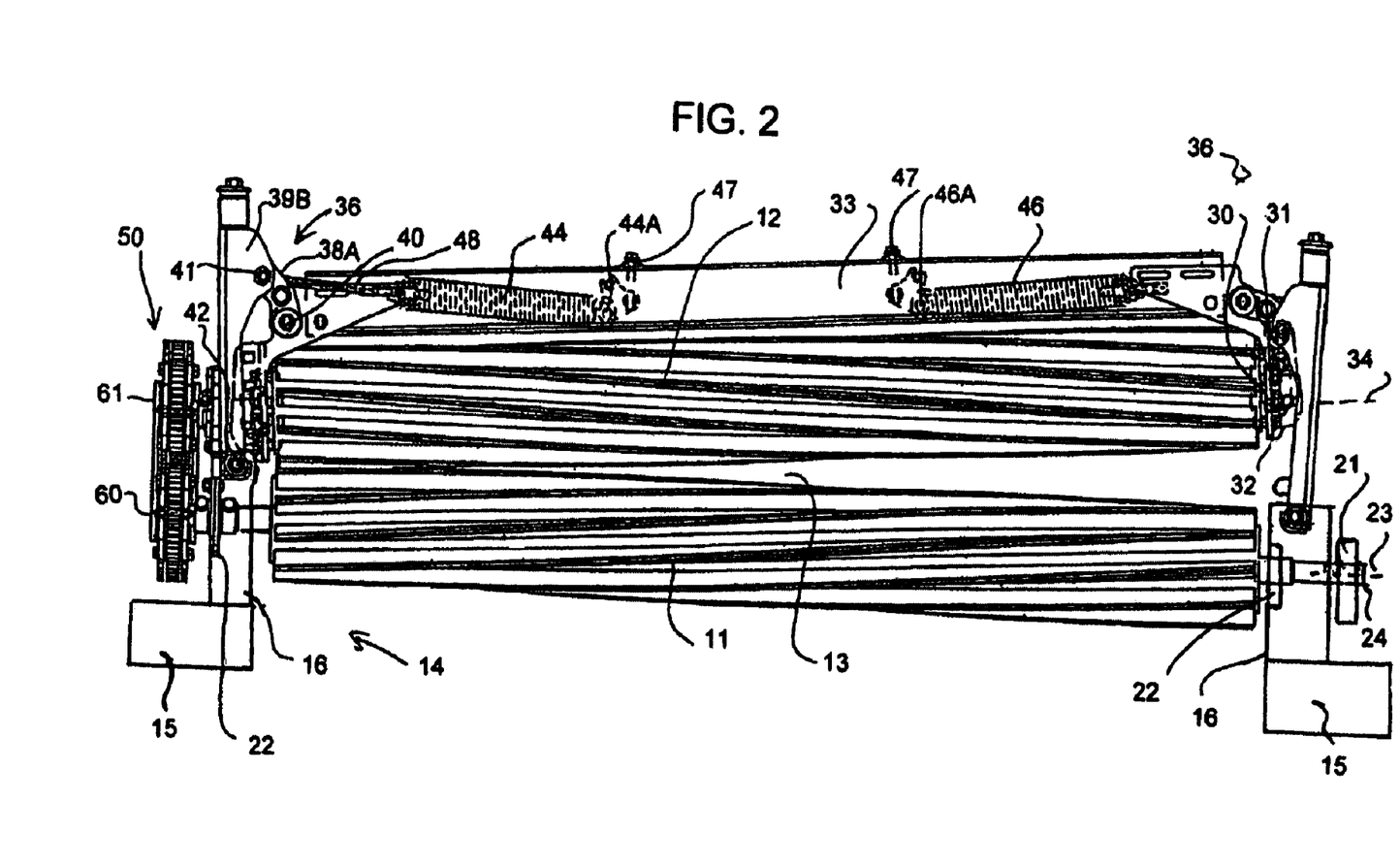
FIG. 2 is front elevational view of the forage conditioner of FIG. 1.
Figure 3:
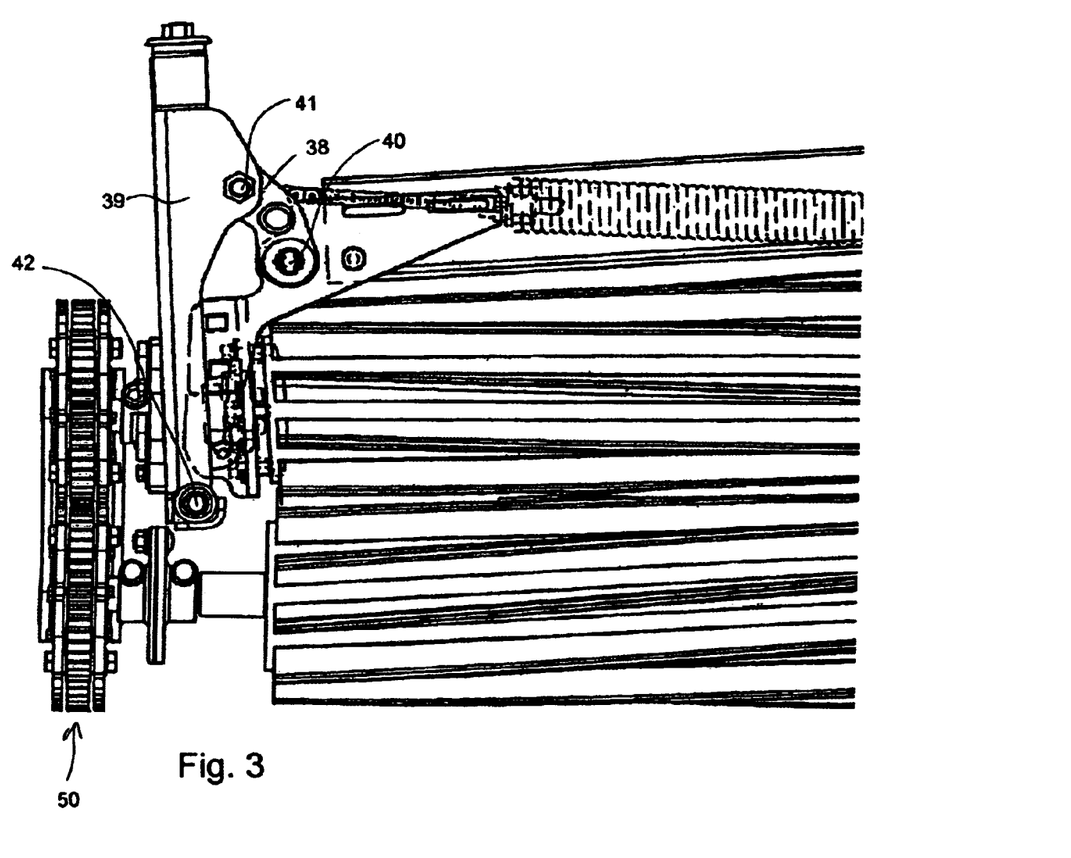
FIG. 3 is front elevational view of one end only of the forage conditioner of FIG. 1 on an enlarged scale showing the rollers in the spaced or closed position.
Figure 4:
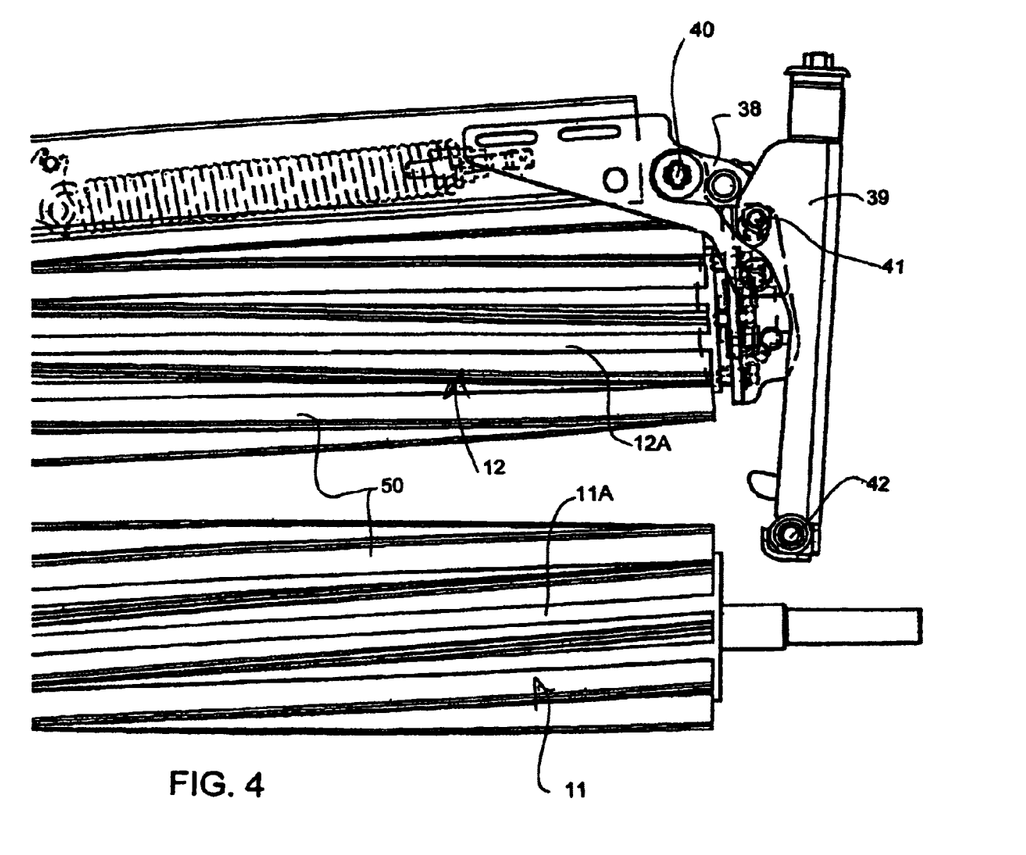
FIG. 4 is front elevational view of one end only of the forage conditioner of FIG. 1 on an enlarged scale showing the rollers in the open position.

The arrangement is of course co-planar so that all of the wheels sit in a common plane as shown in FIG. 2 in constant meshing arrangement.

The third idler wheel 55 and the fourth idler wheel 56 are supported and held in position by a first arm 60 and by a second arm 61 which are held together by a link 62.

The first arm 60 is free to rotate relative to the first roller 11 and the first gear wheel 51 but has its end 60A carried on the shaft of the first roller so that it is free to rotate around that shaft. Symmetrically the arm 61 has its end 61A attached to the shaft of the second roller 12 and the second gear wheel 54 but again it is free to rotate around the axis of that shaft.

Each of the arms, at its end remote from the end attached to the respective roller carries an end portion 60B, 61B which surrounds the axis of the respective third and fourth idler wheels. Thus the portion 60B surrounds the axis 63 of the idler wheel 55 and the portion 61B surrounds the axis 64 of the fourth idler wheel 56. The portion 60B carries on its outside periphery meshing teeth 60C. The portion 61B carries on its periphery meshing teeth 61C. The teeth 60C mesh with the teeth 61C. The link 62 supports the axes 63 and 64 at a fixed spacing to maintain the teeth 60C and 61C in meshing engagement as the arms pivot around the axes 63 and 64 respectively.

Thus the arms are free to rotate about the axes 63 and 64 respectively. However as the arm 60 rotates about the axis 63, the meshing engagement between the teeth causes the arm 61 to rotate around the axis 64 in a symmetrical manner. Thus the first and second arms are constrained to move symmetrically relative to an imaginary line 66 joining the axes 63 and 64. The arm 60 defines an imaginary center line 67 which connects the axis 63 to the axis of the first roller 11. Symmetrically the arm 61 defines a center line 68 which connects the axis 64 to the axis of the second roller 12.

By comparing FIGS. 5 and 6, it will be noted that the center lines 67 and 68 are maintained symmetrical relative to the line 66 by the intermeshing of the teeth 61C with the teeth 60C. Thus there is an angle 1 between the line 67 and the line 66 and an angle 2 between the line 68 and the line 66. These angles are equal. As the rollers move apart due to the lifting of the upper roller 12, the arms 60 and 61 rotate around the axis of their respective rollers so that the angle 1 increases to the angle 1A and the angle 2 increases to the angle 2A but the angle 1A remains identical to the angle 2A thus keeping the arms symmetrical.

It will be noted therefore that the top roller moves within a plane defined by a line 70 which passes through the axis of the top roller 12 and also to the axis of the bottom roller 11. Thus the movement is linear along the line 70 and the axes remain coplanar at all times.

The symmetrical arrangement provided by the arms and the link as described above holds the second roller in the required or angular orientation relative to the first roller as it moves along the line 70 so that the proper meshing condition is maintained along the full length of the roller despite the movement of the roller to increase and decrease the spacing therebetween.

The top roll 12 can move in a straight line and still maintain proper timing. As the top roll moves, the arms 60 and 61 and the link 62 connecting them keep the gears in proper relationship to each other. There is no angular acceleration (roll rotation) of the top roll 12 as it opens. This is accomplished by the meshing set of gear teeth on the arms 60 and 61 which intermesh with each other and force the angles 1 & 2 to always be equal as the top roll 12 moves. This equal angle situation eliminates any rotation of the top roll as it opens. As the rolls open, idler 55 rolls around gear 51 and idler 56 rolls around gear 54, exactly the same amount but in the opposite directions, thus exactly and completely canceling any rotation of the top roll with respect to the bottom.

In the Vermeer patent mentioned above, it is suggested that their system cancels any "substantial" rotation. Analysis of their design reveals that although the rotation is reduced greatly compared to the design shown in the patent of Deere also mentioned above, it is not totally eliminated, and some angular acceleration (roll rotation) is present. Therefore, the amount that the rolls can be allowed to open must be restricted to minimize this effect. The negative effect of this rotation is partially described in the Vermeer patent (see "Background of the Invention" section) where it explains what happens when the gear side of the conditioner is opened and the other remains closed. Another negative effect is that in operation the rolls generally open and close very quickly, often in a fraction of a second. This means that the roll must be rapidly rotated back and forth the amount of this rotation in that fraction of a second. If this rotation is significant, extremely high inertia loads are generated. In the present design this rotation is always zero, and therefore no inertia loads are generated.

As described above, if angular acceleration (roll rotation) is present the amount that the roll can be allowed to open must be restricted to minimize the negative effect of the roll rotation. In the present design the amount of opening is restricted only by the selection of gear sizes and related geometry. Greater roll opening means that larger lumps can pass through the conditioner without plugging.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A conditioner for conditioning cut crop material from a harvester comprising:
   a first roller and a second roller,
   each roller having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;
   a mounting assembly for mounting the rollers in generally parallel relationship for rotation of each roller about its axis;
   the mounting assembly mounting the rollers so as to allow relative movement of the second roller relative to the first roller in a direction to increase and decrease spacing between the axes of the rollers from a closed position in which the flutes of the second roller intermesh with the flutes of the first roller to an open position in which the flutes of the rollers are no longer intermeshing;
   the mounting assembly including a first mounting arrangement at a first end of the rollers and a second mounting arrangement at a second end of the rollers with the first and second mounting arrangements arranged to allow independent relative movement of the second roller between the closed position and the open position at each end of the rollers;
   each of the first and second mounting arrangements including a respective link pivotal about a respective link pivot axis;
   the mounting assembly defining a plane of movement of the second roller with the plane of movement containing the axis of the second roller;
   the links each being pivotal about the respective link pivot axis which is arranged at right angles to the plane of movement so as to direct the movement of the second roller such that its axis remains within the plane of movement;
   the rollers being substantially coextensive such that a first end of the first roller lies adjacent a first end of the second roller and a second end of the first roller lies adjacent a second end of the second roller;
   a drive input for driving rotation of at least one of the first and second rollers; and
   a drive timing device for transferring rotation between the first roller and the second roller arranged to maintain accurate angular timing between the first and second rollers as the rollers rotate and as the spacing between the axes of the rollers changes.

2. The conditioner according to claim 1 wherein the plane of movement is arranged such that it contains the axes of the first and second rollers.

3. The conditioner according to claim 1 wherein the link has a first end pivotal relative to a mounting fixed relative to the second roller about a first link pivot axis at right angles to said plane of movement and a second end pivotal about a second link pivot axis parallel to and spaced from the first link axis.

4. The conditioner according to claim 3 wherein the second end of the pivotal link is pivotally connected to a link portion pivotal relative to the link about the second link pivot axis and the link portion being movable in a direction longitudinal of the axis of the roller to accommodate pivotal movement of the link.

5. The conditioner according to claim 1 wherein the second roller is mounted in a support including a top member parallel to the second roller from which the second roller is supported, and wherein the link is pivotal relative to the top member.

6. The conditioner according to claim 5 wherein there is provided a spring acting to bias the second roller downwardly toward the first roller and wherein the spring is connected between the top member end the link.

7. The conditioner according to claim 6 wherein the spring extends along the top member generally parallel to the axis of the second roller.

8. The conditioner according to claim 1 wherein there is provided a spring acting to bias the second roller downwardly toward the first roller and wherein the spring acts to apply force to the second roller through the link and extends generally parallel to the axis of the second roller.

9. The conditioner according to claim 1 wherein the drive timing device assembly comprises:
   a first gear wheel attached to the first roller at one end thereof and coaxial therewith about the first roller axis;
   a second gear wheel attached to the second roller at one end thereof and coaxial therewith,
   a third idler gear meshing with the first gear and a fourth idler gear meshing with the third idler gear and the second gear wheel such that rotation of the first roller is communicated through the third and fourth idler gears and the second gear wheel to the second roller;

the first gear wheel, the second gear wheel and the third and fourth idler wheels being coplanar and arranged for rotation about parallel axes;

a first arm mounted for pivotal movement about the axis of the first roller;

a second arm mounted for pivotal movement about the axis of the second roller;

the third idler wheel being mounted on the first arm for rotation relative thereto about a third idler wheel axis thereon;

the fourth idler wheel being mounted on the second arm for rotation relative thereto about a fourth idler wheel axis thereon;

the first and second arms being linked for pivotal movement of the first arm relative to the second arm about the axis of the third idler roller and for pivotal movement of the second arm relative to the first arm about the axis of the fourth idler roller;

and the first and second arms being constrained to move symmetrically relative to an imaginary center line at right angles to a line joining the axes of the first and second rollers to maintain an angle of the first arm between the imaginary center line and a line joining the first roller axis and the third idler wheel axis equal to an angle of the second arm between the imaginary center line and a line joining the second roller axis and the fourth idler wheel axis.

10. The conditioner according to claim 9 wherein the first and second arms are linked by a link member connected to the first arm for pivotal movement about the third idler wheel axis and connected to the second arm for pivotal movement about the fourth idler wheel axis.

11. The conditioner according to claim 9 wherein the first and second arms are constrained to move symmetrically by intermeshing gear teeth provided on the first arm and centered around the third idler wheel axis and provided on the second arm and centered around the fourth idler wheel axis.

12. A conditioner for conditioning cut crop material from a harvester comprising:

a first roller and a second roller, each roller having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the rollers in generally parallel relationship for rotation of each roller about its axis;

the mounting assembly mounting the rollers so as to allow relative movement of the second roller relative to the first roller in a direction to increase and decrease spacing between the axes of the rollers from a closed position in which the flutes of the second roller intermesh with the flutes of the first roller to an open position in which the flutes of the rollers are no longer intermeshing:

the mounting assembly defining a lane of movement of the second roller with the plane of movement containing the axis of the second roller;

the mounting assembly being arranged to direct the movement of the second roller such that its axis remains within the plane of movement;

the rollers being substantially coextensive such that a first end of the first roller lies adjacent a first end of the second roller and a second end of the first roller lies adjacent a second end of the second roller;

a drive input for driving rotation of at least one of the first and second rollers; and a drive timing device for transferring driving rotation between the first roller and the second roller to maintain accurate angular timing between the first and second rollers as the rollers rotate and as the spacing between the axes of the rollers changes;

wherein the drive timing device comprises:

a first gear wheel attached to the first roller at one end thereof and coaxial therewith about the first roller axis;

a second gear wheel attached to the second roller at one end thereof and coaxial therewith, a third idler gear meshing with the first gear and a fourth idler gear meshing with the third idler gear and the second gear wheel such that rotation of the first roller is communicated through the third and fourth idler gears and the second gear wheel to the second roller;

the first gear wheel, the second gear wheel and the third and fourth idler wheels being coplanar and arranged for rotation about parallel axes;

a first arm mounted for pivotal movement about the axis of the first roller;

a second arm mounted for pivotal movement about the axis of the second roller;

the third idler wheel being mounted on the first arm for rotation relative thereto about a third idler wheel axis thereon;

the fourth idler wheel being mounted on the second arm for rotation relative thereto about a fourth idler wheel axis thereon;

the first and second arms being linked for pivotal movement of the first arm relative to the second arm about the axis of the third idler roller and for pivotal movement of the second arm relative to the first arm about the axis of the fourth idler roller;

and the first and second arms being constrained to move symmetrically relative to an imaginary center line at right angles to a line joining the axes of the first end second rollers to maintain an angle of the first arm between the imaginary center line and a line joining the first roller axis and the third idler wheel axis equal to an angle of the second arm between the imaginary center line and a line joining the second roller axis and the fourth idler wheel axis.

13. The conditioner according to claim 12 wherein the first and second arms are linked by a link member connected to the first arm for pivotal movement about the third idler wheel axis and connected to the second arm for pivotal movement about the fourth idler wheel axis.

14. The conditioner according to claim 12 wherein the first and second arms are constrained to move symmetrically by intermeshing gear teeth provided on the first arm and centered around the third idler wheel axis and provided on the second arm and centered around the fourth idler wheel axis.

15. A conditioner for conditioning cut crop material from a harvester comprising:

a first roller and a second roller, each roller having a generally cylindrical roller surface and a plurality of side by side flutes at angularly spaced positions therearound, the flutes projecting radially outwardly to a flute edge spaced outwardly of the roller surface and extending longitudinally along the roller substantially along the full length thereof;

a mounting assembly for mounting the rollers in generally parallel relationship for rotation of each roller about its axis;

the mounting assembly mounting the rollers so as to allow relative movement of the second roller relative to the first roller in a direction to increase and decrease spacing between the axes of the rollers from a closed position in which the flutes of the second roller intermesh with the flutes of the first roller to an open position in which the flutes of the rollers are no longer intermeshing;

the rollers being substantially coextensive such that a first end of the first roller lies adjacent a first end of the second roller and a second end of the first roller lies adjacent a second end of the second roller;

a drive input for driving rotation of at least one of the first and second rollers; and a drive timing device for transferring driving rotation between the first roller and the second roller to maintain accurate angular timing between the first and second rollers as the rollers rotate and as the spacing between the axes of the rollers changes;

wherein the mounting assembly defines a plane of movement of the second roller with the plane of movement containing the axes of the first and second rollers;

wherein the mounting assembly includes a first mounting arrangement at a first end of the rollers and a second mounting arrangement at a second end of the rollers with the first and second mounting arrangements arranged to allow independent relative movement of the second roller between the closed position and the open position at each end of the rollers;

wherein each of the first and second mounting arrangements includes:

a support attached to the second roller, a first link pivotal about a first link pivot axis which is at right angles to a plane longitudinal of the second roller axis and lying in the direction of movement of the second roller;

wherein the first link has a first end pivotal relative to the mounting assembly about said first link pivot axis and a second end pivotal about a second link pivot axis parallel to and spaced from the first link pivot axis;

wherein the second end of the pivotal link is pivotally connected to a second link pivotal relative to the first link about the second link pivot axis and the second link being movable in a direction longitudinal of the axis of the roller to accommodate pivotal movement of the first link;

wherein the first link constrains movement of the second roller such that its axis remains within the plane of movement.

16. The conditioner according to claim 15 wherein the support comprises a top member parallel to the second roller from which the second roller is supported, and wherein the first link is pivotal relative to the top member.

17. The conditioner according to claim 16 wherein each of the first and second mounting arrangements includes a spring acting to bias the second roller downwardly toward the first roller and wherein the spring is connected between the top member and the first link.

18. The conditioner according to claim 17 wherein the spring extends along the top member generally parallel to the axis of the second roller.

19. The conditioner according to claim 15 wherein each of the first and second mounting arrangements includes a spring acting to bias the second roller downwardly toward the first roller and wherein the spring acts to apply force to the second roller through the first link and extends generally parallel to the axis of the second roller.

* * * * *